United States Patent
Mishra et al.

(10) Patent No.: US 10,319,370 B2
(45) Date of Patent: *Jun. 11, 2019

(54) SYSTEM AND METHOD FOR DATA-DRIVEN SOCIALLY CUSTOMIZED MODELS FOR LANGUAGE GENERATION

(71) Applicant: AT&T Intellectual Property I, L.P., Atlanta, GA (US)

(72) Inventors: Taniya Mishra, New York, NY (US); Alistair D. Conkie, Morristown, NJ (US); Svetlana Stoyanchev, Jersey City, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/978,529

(22) Filed: May 14, 2018

(65) Prior Publication Data

US 2018/0261209 A1 Sep. 13, 2018

Related U.S. Application Data

(63) Continuation of application No. 15/229,368, filed on Aug. 5, 2016, now Pat. No. 9,972,309, which is a continuation of application No. 14/275,938, filed on May 13, 2014, now Pat. No. 9,412,358.

(51) Int. Cl.
| | |
|---|---|
| *G10L 13/04* | (2013.01) |
| *G10L 15/07* | (2013.01) |
| *G10L 13/027* | (2013.01) |
| *G10L 15/18* | (2013.01) |
| *G10L 17/00* | (2013.01) |
| *G10L 15/183* | (2013.01) |
| *G10L 15/02* | (2006.01) |
| *G10L 17/22* | (2013.01) |

(52) U.S. Cl.
CPC ............ *G10L 15/07* (2013.01); *G10L 13/027* (2013.01); *G10L 15/02* (2013.01); *G10L 15/183* (2013.01); *G10L 15/1815* (2013.01); *G10L 17/00* (2013.01); *G10L 17/22* (2013.01)

(58) Field of Classification Search
CPC ................................ G10L 13/04; G10L 15/26
See application file for complete search history.

(56) References Cited

U.S. PATENT DOCUMENTS

| | | | |
|---|---|---|---|
| 6,446,039 B1 | 9/2002 | Miyazawa et al. | |
| 6,941,264 B2 | 9/2005 | Konopka et al. | |
| 6,970,820 B2 * | 11/2005 | Junqua | G10L 13/04 704/258 |
| 7,062,441 B1 | 6/2006 | Townshend | |

(Continued)

*Primary Examiner* — Shreyans A Patel (57) ABSTRACT

Systems, methods, and computer-readable storage devices for generating speech using a presentation style specific to a user, and in particular the user's social group. Systems configured according to this disclosure can then use the resulting, personalized, text and/or speech in a spoken dialogue or presentation system to communicate with the user. For example, a system practicing the disclosed method can receive speech from a user, identify the user, and respond to the received speech by applying a personalized natural language generation model. The personalized natural language generation model provides communications which can be specific to the identified user.

20 Claims, 4 Drawing Sheets

(56) References Cited

U.S. PATENT DOCUMENTS

| | | | |
|---|---|---|---|
| 7,657,433 | B1 | 2/2010 | Chang |
| 8,050,922 | B2 | 11/2011 | Chen |
| 8,056,070 | B2 | 11/2011 | Goller et al. |
| 8,150,695 | B1 | 4/2012 | Killalea |
| 8,364,469 | B2 | 1/2013 | Neale |
| 9,106,812 | B1 | 8/2015 | Price |
| 2002/0087315 | A1 | 7/2002 | Lee et al. |
| 2003/0163314 | A1 | 8/2003 | Junqua |
| 2005/0096909 | A1 | 5/2005 | Bakis |
| 2007/0183604 | A1 | 8/2007 | Araki et al. |
| 2008/0291325 | A1 | 11/2008 | Teegan |
| 2011/0184736 | A1 | 7/2011 | Slotznick |
| 2011/0295603 | A1 | 12/2011 | Meisel |
| 2012/0197629 | A1 | 8/2012 | Nakamura et al. |
| 2014/0278354 | A1* | 9/2014 | Ganong, III ............ G10L 15/26 704/9 |
| 2015/0161999 | A1 | 6/2015 | Kalluri |

* cited by examiner

SYSTEM AND METHOD FOR DATA-DRIVEN SOCIALLY CUSTOMIZED MODELS FOR LANGUAGE GENERATION

PRIORITY INFORMATION

The present application is a continuation of U.S. patent application Ser. No. 15/229,368, filed Aug. 5, 2016, which is a continuation of U.S. patent applicant Ser. No. 14/275,938, filed May 13, 2014, now U.S. Pat. No. 9,412,358, issued Aug. 9, 2016, the content of which are incorporated herein by reference in their entirety.

BACKGROUND

1. Technical Field

The present disclosure relates to personalization of text and synthesized speech in a dialog and more specifically to generating text and speech using a presentation style specific to a user's social group, which can be used in a spoken dialogue or in a presentation system.

2. Introduction

In a human-human dialogue, people can adapt their interaction to each other based on what each person hears. For example, if one person in a conversation hears a foreign accent from the other, subsequent human-human dialog may have a slower speed than prior to identifying the foreign accent. Also, when people know more about one another, they can adapt their dialog accordingly—such as when both individuals are known to be IT specialists, those individuals can communicate using vocabulary which might not be known to HR specialists. Adapting interactions between a human and a dialog system, by contrast, can be difficult because many dialogue systems utilize a template-based natural-language generation, where the natural-language generated fits specific patterns defined in the templates used. As an example, if a system were constructing a natural-language response to a question stated by the user, the system can use a template having allocated fields for a "Yes/No" response, specific nouns used by the user, a verb used by the user, and other associated fields for describing those nouns and verbs such as adjectives and adverbs.

DETAILED DESCRIPTION

Systems, methods and computer-readable storage devices are disclosed which generate text and/or speech using a presentation style specific to a user, and in particular the user's social group. Systems configured according to this disclosure can then use the resulting, personalized, text and/or speech in a spoken dialogue or presentation system to communicate with the user. For example, a system practicing operational concepts disclosed herein can receive speech from a user, identify the user, and respond to the received speech by applying a personalized natural language generation model. The personalized natural language generation model provides communication style which can be specific to the identified user. For example, the personalized natural language generation model can provide vocabulary specific to the user's profession, location, place of education, place of birth, ethnicity, socio-economic class, or other demographic data, as well as providing speech with a prosody, accent, or other sound variation corresponding to the identified user. Identifying this information allows the social group of the user to be approximated.

Consider a system, configured according to this disclosure, which receives speech from a user. The system can identify the user, then apply a personalized natural language generation model while performing, as part of a dialog system, automatic speech recognition and/or natural language generation. The personalized natural language generation model was produced by using data specific to persons, characters, and/or demographics associated with the identified user. An exemplary personalized natural language generation model can be made using literary narratives, such as books, articles, and/or transcriptions, extracted from a network such as the Internet or databases, where speakers in the literary narratives are identified. The identification can be specific, naming or otherwise identifying individual speakers (for example, "George Washington") and/or can be generic (for example, an "Older Gentleman"). Quotes are attributed to the identified speakers of the literary narrative in a quotation lattice. Both personality independent and personality dependent attributes are identified within the quotation lattice, and the quotation lattice is organized based on the personality independent attributes. The resulting personality independent quotation lattice is further organized based on a stylistic analysis of the personality independent quotation lattice, resulting in the personalized natural language generation model.

An alternative system embodiment could perform only the production of the personalized natural language generation model, while yet another system embodiment could both generate the personalized natural language generation model and engage in a dialog with a user. For example, configurations which construct the personalized natural language generation model can also identify users based on utterances received, perform the personality attribute analysis, organize (or re-organize) the quotation lattice based on independent and/or dependent attributes, as well as perform a stylistic analysis.

When the personalized natural language generation model is being produced, speakers from various sources (such as a literary narrative, videos, social media) are identified. For example, if the user has been identified as an Older Woman, the system can look for speech, text, video, and/or other data associated with an Older Woman. If searching literary narratives, the system may search novels, magazine articles, books, short stories, blog posts, television transcripts, and/or social media such as Facebook or Twitter, for entries, quotations, or other information provided by other "Older Women." Such entries can be found over the Internet or in local databases and media. Another example could be detecting teenage, geographic, age, or other demographic "slang" or vocabulary specific to the individual user. Such factors all play into the social group of the user.

Consider the example of identifying quotations from a literary narrative. First, the identification of story characters must occur via an analysis. A story character is not necessarily a story speaker. A character may appear in the story but may not have any quote associated with him and hence is not a speaker. Characters in children's stories can be human or non-human entities, i.e., animals and non-living objects, exhibiting anthromorphic traits. The interactions among characters can either be human-to-human or human-to-non-human interactions. Two exemplary approaches to identifying story characters are (1) named entity recognition for identifying proper names, e.g., "Hansel," and (2) a set of part-of-speech patterns can be used to extract human and non-human characters not represented by proper names, e.g., "wolf."

Such parts of speech based patterns can allow for creation of large sets of characters. In order to restrict the characters, world knowledge can be incorporated through the use of WordNet, a lexical database for English, and/or other lexical databases for English or any other language. For each candidate character the hierarchy of its hypernyms is traversed up to the root. Regarding polysemous characters the first two senses are considered. A character is retained if any of the hypernyms are found to fall into certain types of lexical database concepts, such as person, anima, plant, artifact, spiritual being, and physical entity.

After identifying speakers in the literary narrative, construction of the personalized natural language generation model can require quote attribution to the identified characters. The goal is to attribute (or assign) each quote to a specific story character from the set of identified characters. The identification of quotes in the story can be based on a simple pattern-based approach, such as quote boundaries, or tags, within appropriate chunks of text. Generally, such chunks tend to appear within the passage of the story enclosed by quotes. Three types of attribution are possible: (1) explicit mention of speakers, e.g., "'Done!' said Hans, merrily", (2) anaphoric mention of speakers, e.g., "'How happy am I!' cried he, (3) sentence of quotes, e.g., "And where did you get the pig?" . . . "I gave a horse for it." In the first type of attribution, the speaker is explicitly mentioned in the vicinity of the quote. This is also true for the second type, however, a pronominal anaphora is used to refer to the speaker. The first two attribution types are characterized by the presence of "within-quote" (e.g., "Done!") and "out-of-quote" (e.g., "said Hans, merrily") content. This is not the case for the third attribution type for which only "in-quote" content is available.

Before quote-attribution is performed, the list of story characters can be pruned by identifying the characters that are "passively" associated with speech verbs. This can be applied at the sentence, paragraph, or story level. Some examples of speech verbs are: said, responds, sing, etc. For instance, in " . . . Hans was told . . . " "Hans" is a passive character. The passive characters are identified via detection of relations extracted by dependency parsing, such as a passive nominal subject relationship and an object of a preposition relationship. Given a sentence that includes one or more quotes, the respective passive characters will not be considered as candidate speakers.

Several syntactic patterns can be applied to associate quotes with explicit mention of speakers in their vicinity to characters from the pruned list of story characters. These patterns are developed around speech verbs. In the example above, "Hans" is associated with the quote "Done!" via the speech verb "said." Variations of the following pattern can be used to detect such occurrences: (1) QT SV CH, (2) QT CH SV, (3) CH SV QT, where QT denotes a quote boundary, SV denotes a speech verb, and CH denotes a story character. A possible limitation of such patterns is they capture associations only when the character and speech verb are in close textual distance. As a result, distant associations can be missed. In order to address this distant association issue, the character reference is extracted from either a dependency relation which links a speech verb to a character which is the syntactic subject of a clause and/or from a dependency relation which links a speech verb with a character that is the direct object of the speech verb across a conjunct (e.g., and, or). Using a hybrid approach of pattern recognition where possible and a machine-learning for quotes not captured by syntactic patterns can lead to increased accuracy.

A similar approach can be used in the anaphoric case, the difference being that the character (CH) includes the following pronouns: he, she, they, himself, herself, and themselves. After associating a pronoun with a quote, the quote can be attributed to a story character via co-reference resolution analysis. If a co-reference resolution analysis does not resolve a pronominal anaphora, the following heuristic can be adopted. The previous n paragraphs can be searched and the pronoun under investigation can be mapped to the closest (in terms of textual proximity) story character that had the same gender as the pronoun. During the paragraph search, anaphoric mentions can also be taken into consideration by co-reference resolution.

Despite the above approaches, it is possible to have non-attributed quotes. In such cases, the following procedure is followed for those story sentences that (i) do not constitute "pure" quotes (i.e., consist of "in-quote" and "out-of-quote" content), and (ii) include at least one "out-of-quote" speech verb. First, all the character (as well as pronouns) that occur within the "out-of-quote" content are aggregated and serve as valid candidates for attribution. Second, if multiple characters and pronouns exist, then they are mapped (if possible) via co-reference resolution in order to narrow down the list of attribution candidates. Third, the quote is attributed to the nearest quote character (or pronoun). For the computation of the textual distance both quote boundaries (i.e., start and end) can be considered, or only a single quote boundary can be considered. If the quote is attributed to a pronoun that is not mapped to any character, then co-reference resolution can be applied.

"Pure" quotations, i.e., quotations which include "in-quote" content only, are attributed as follows. The sentences, clauses, paragraphs, etc., are parsed sequentially starting from the beginning of the story. Each time a character is encountered within a sentence, it is pushed into a "bag-of-characters," a list of every character encountered. This is done until a non-attributed "pure" quote is found. At this point it can be assumed that the candidate speaker for the current (and next) "pure" quote are included within the "bag-of-characters." The subsequent "pure" quotes are examined in order to spot any included characters. Such characters are regarded as "good" candidates enabling the pruning of the list of candidate speakers. The goal is to end up with exactly two candidate speakers for a back and forth dialogue. The initiating speaker is identified by taking into account the order of the names mentioned within the quote. Quote attribution follows in an alternating fashion. For example, consider a sequence of four non-attributed "pure" quotes and a bag of two candidate speakers $s_i$ and $s_j$ (if more than two candidates exist, the system can give ambiguous attributions, i.e., multiple speakers for one quote). If $s_i$ was identified as the initiating speaker, then the first and third quotes are attributed to $s_i$, while the second and fourth quotes are attributed to $s_j$. The "bag-of-characters" is reset, and the same process is repeated for the rest of the story.

Gathering quotes from other sources can be substantially easier. For example, the author of a blog, article, or social media post may be known. Likewise, the demographics, such as age, gender, and personality, may be similarly known or easily extracted, in which case the social group of the user can be easily extracted and identified. In the case of a literary narrative, such attributes can require a more complex analysis, examples of which are provided.

An exemplary gender analysis of story characters can use a hybrid approach, fusing two types of different information: (i) linguistic information extracted from the story under analysis, and (ii) information taken from external resources that do not depend on the analyzed story. For example, a quote attributed to a U.S. President (to the present date) be attributed to a male. Likewise, a quote attributed to an NBA player (to the present date) can likewise be attributed to a male. Regarding story-specific information, the associations between characters and third person pronouns (identified via anaphora resolution) can be counted and used in order to estimate gender probability.

Story-independent resources can include the U.S. Social Security Administration baby name database in which baby names are linked with gender, or a large name-gender association list developed using a corpus-based boot-strapping approach which includes the estimated gender for non-person entities. A name-gender association list can include a numerical estimate indicating the probability that a given name belongs to a given gender. Such probabilities can be used in combination with other resources and information, as well as specific story information, to estimate the probability a respective gender should be applied to the quote being analyzed.

An example of age estimation based on quotations is using features extracted from the quotes via machine-learning. For example, the system producing the personalized natural language generation model can count: periods, commas, semicolons, exclamation marks, 1st person singular pronouns, 1st person plural pronouns, combined 1st person singular and plural pronouns, negative particles, numbers, prepositions, pronouns, question marks, words longer than six letters, total quotes, 2nd person singular pronouns, positive words, negative words, nouns, verbs, adjectives, and/or adverbs. An age analysis can use these counts to estimate an age for the quoted individual. N-grams can also be used by the age analysis, where the n-grams (up to 3-grams) are extracted either using the quote as-is (i.e., in its lexical form) or using parts-of-speech tags of the quote. The presence/type of punctuation between candidate characters and quotes can likewise be used to classify characters. As additional information is received, such a via feedback, correction, or just data associated with the quotes, the age estimation algorithm can be updated.

Likewise, personality attribution can occur via a machine-learning approach. For estimation of personality attributes of story speakers, the counts used for age estimation can also be employed, with the assumption that words people use and how they speak them reflect their personalities, where the personality can be estimated by these linguistic features. Exemplary salient personality types which can be identified include: beautiful, brave, cowardly, evil, feisty, greedy, handsome, kind, loving, loyal, motherly, optimistic, spunky, sweet, and wise. Likewise, "none" can be used when a character is not described using any of attributes listed above.

Estimation of speaker attributes which are speaker independent (e.g., age, gender, dialectial-region, etc.) can be done as described. Estimating speaker attributes which are speaker dependent can require the application of the aforementioned algorithms to social communication documents such as novels, screen plays, closed-captioning text of talk shows, news, sportscasts, etc., to automatically collect utterances spoken by different speakers in each collected document. Once the set of textual documents has been processed, the resulting speakers will be grouped in terms of their personality-independent attributes, (for example, Young-Adult:Female:UpperSouthLexicon, Male:Elderly:NewEnglandLexicon). Other utterances attributed to other speakers that fall into similar categories will be put into the groups, which will then be used to build the personalized natural language model.

Determining which group a speaker belongs in can require a syntactic analysis, including a lexical and/or syntactic analysis of choices used by characters in the different social groups. The syntactic analysis can use automatic semantic processing of the collected corpus of quotations/utterances. This analysis will automatically generate semantic representations for each utterance in the corpus. By comparing realizations of related semantic concepts across the utterances in social groups, generation rules and stylistic differences of representing similar information can be extracted. In the same vein, style can be separated from content, then used for modeling personalized natural language generation in spoken systems. For example, if a user is a teenager, the model uses a style and vocabulary of a teenager category to generate responses for the teenage user. A different style and vocabulary will be used to address an elderly person. The style of natural language generation is adapted based on the social groups such that user perception of generated speech/text is increased upon the system "speaking the same language" as the user.

The stylistic analysis identifies lexical and/or semantic differences between quotations associated with distinct demographics of the identified speakers recorded in the quotation lattice. For example, perhaps teenagers use distinct vocabulary from older individuals, resulting in a lexical difference. Those same teenagers may include a distinct rhythm, pitch, pause-structure, and/or other prosody related speech structure, resulting in a semantic difference. The stylistic analysis can note each of these differences Personalized natural language generation models used by systems configured according to this disclosure can retrieve data specific to a user's social group from a network or database, such as the Internet, or from proprietary knowledge, such as a customer database. The systems, in identifying the identity of the user, can also identify various demographics about the user. Such demographics can include age, gender, dialectial-region, nationality, socio-economic group, first language, education level, profession, education, or any other data associated with the user which can be extracted from a voice analysis.

Various embodiments of the disclosure are described in detail below. While specific implementations are described, it should be understood that this is done for illustration purposes only. Other components and configurations may be used without parting from the spirit and scope of the disclosure. A system, method and computer-readable storage devices are disclosed which receive speech from a user, identify the user, and respond with personalized speech to the user using a personalized natural language generation model. A brief introductory description of a basic general purpose system or computing device in FIG. 1 which can be employed to practice the concepts, methods, and techniques disclosed is illustrated. A more detailed description of data driven socially-customized models for language generation use and construction will then follow, accompanied by various embodiments. Variations shall be described herein as the various embodiments are set forth. The disclosure now turns to FIG. 1.

Figure 1:
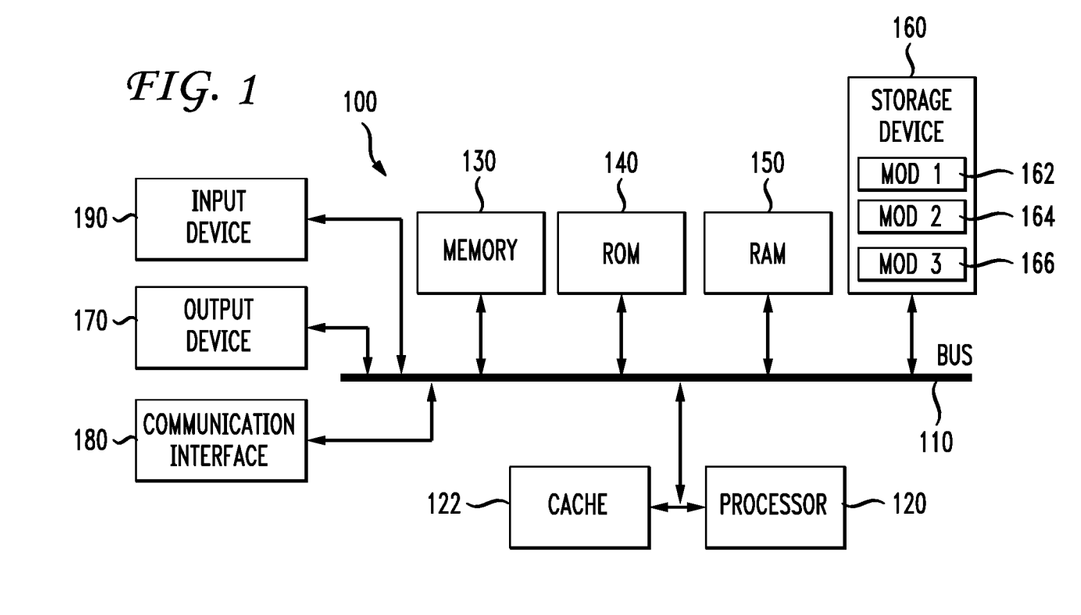
FIG. 1 illustrates an example system embodiment.

With reference to FIG. 1, an exemplary system and/or computing device 100 includes a processing unit (CPU or processor) 120 and a system bus 110 that couples various system components including the system memory 130 such as read only memory (ROM) 140 and random access memory (RAM) 150 to the processor 120. The system 100 can include a cache 122 of high-speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various operations or actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric. The processor 120 can include multiple processors, such as a system having multiple, physically separate processors in different sockets, or a system having multiple processor cores on a single physical chip. Similarly, the processor 120 can include multiple distributed processors located in multiple separate computing devices, but working together such as via a communications network. Multiple processors or processor cores can share resources such as memory 130 or the cache 122, or can operate using independent resources. The processor 120 can include one or more of a state machine, an application specific integrated circuit (ASIC), or a programmable gate array (PGA) including a field PGA.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage devices provide nonvolatile storage of computer-readable instructions, data structures, program modules and other data for the computing device 100. In one aspect, a hardware module that performs a particular function includes the software component stored in a tangible computer-readable storage device in connection with the necessary hardware components, such as the processor 120, bus 110, display 170, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 100 is a small, handheld computing device, a desktop computer, or a computer server. When the processor 120 executes instructions to perform "operations", the processor 120 can perform the operations directly and/or facilitate, direct, or cooperate with another device or component to perform the operations.

Although the exemplary embodiment(s) described herein employs the hard disk 160, other types of computer-readable storage devices which can store data that are accessible by a computer, such as magnetic cassettes, flash memory cards, digital versatile disks (DVDs), cartridges, random access memories (RAMs) 150, read only memory (ROM) 140, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 120 can include all types of processors disclosed herein, including a virtual processor. However, when referring to a virtual processor, the processor 120 includes the software components associated with executing the virtual processor in a virtualization layer and underlying hardware necessary to execute the virtualization layer. The system 100 can include a physical or virtual processor 120 that receive instructions stored in a computer-readable storage device, which cause the processor 120 to perform certain operations. When referring to a virtual processor 120, the system also includes the underlying physical hardware executing the virtual processor 120.

Figure 2:
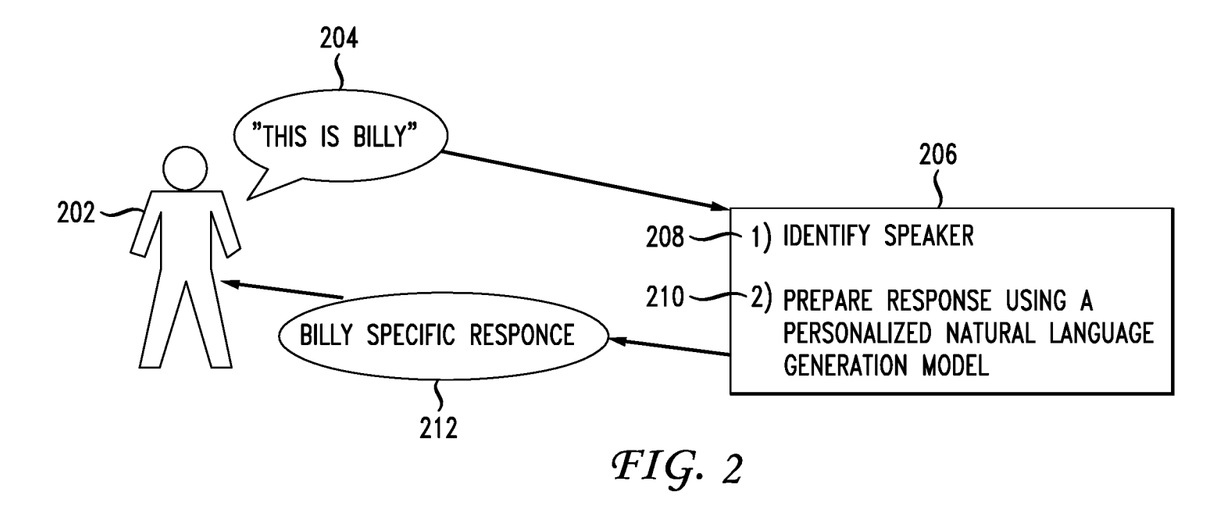
FIG. 2 illustrates an exemplary system application.

Having disclosed some components of a computing system, the disclosure now turns to FIG. 2, which illustrates an exemplary system application. A user 202 provides an utterance 204. The utterance 204 can be a keyword or phrase which the system 206 will recognize, such as "This is Billy," or the utterance 204 can be a non-specific, non-keyword phrase. The system 206 receives the utterance 204 and from the utterance 204 identifies the user 202. If the utterance 204 contains an identification the process of identification by the system 206 is greatly simplified. If not, the system 206 can perform an analysis, including voice analysis, consideration of when, how, and under was conditions the utterance 204 was spoken and/or received. In certain configurations, the system 206 can be linked to a specific user 202, in which case the user identification step can be omitted. In other configurations, the system 206 is across a network and performing multiple iterations of the disclosed processes simultaneously, in which case the voice analysis can be necessary to correctly identify the user 202. If the utterance 204 is captured by a smartphone, tablet, personal computer, laptop, or other web-enabled device, the identification can be done using the identification of the device. For example, if a phone is known to belong to a specific individual, the identification can be linked to the phone, not the utterance 204. If, however, the system 206 identifies that multiple user consistently use the phone, such identification might not be possible.

Once the system 206 receives the utterance 204 and identifies the speaker 208, the system 206 prepares a response 212 using a personalized natural language generation model. The personalized natural language generation model can be built, as described above, using demographics and information specific to the user 202. The model can be specific to the individual 202, or can be generic to individuals having the specific demographics and personality of the user 202. For example, the personalized natural language generation model can be specific to "Billy Jean," or can be shared by everyone who shares Billy Jean's demographics and personality. In this way the system 206 can identify the social group of the user 202, and the personalized response can be specific to the individual and/or the social group.

Figure 3:
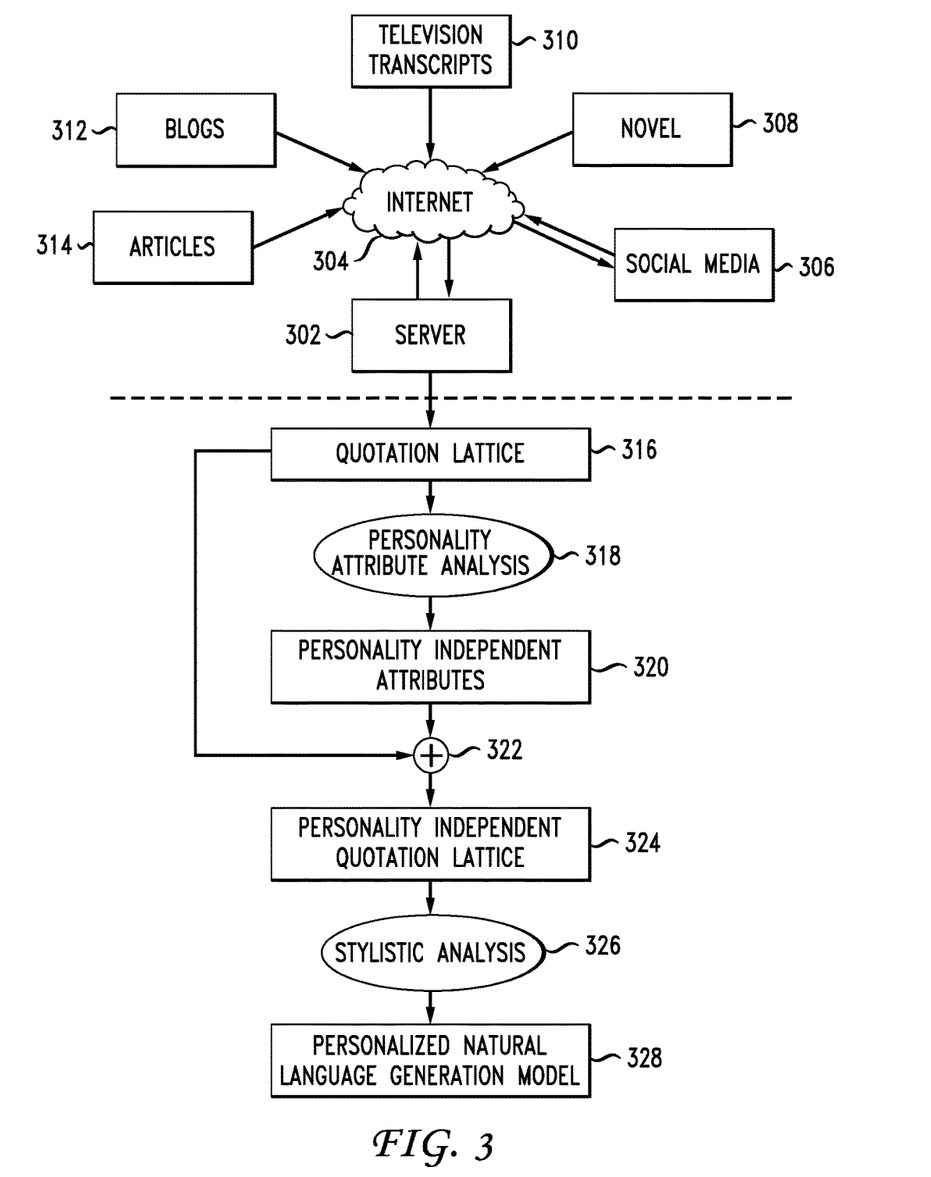
FIG. 3 illustrates an example configuration overview.

FIG. 3 illustrates an example configuration overview for building a personalized natural language generation model. Elements of this process, while shown in series, can be performed in parallel or in alternative order, as required by specific configuration. Likewise, specific configurations can remove elements illustrated as required. A server 302, such as the system 206 of FIG. 2, builds a personalized natural language generation model by searching for quotations across a network or database such as the Internet 304. The quotations can be retrieved from resources such as social media 306, novels 308 and literary narratives, television scripts 310, blogs 312, and articles 314, such as newspaper and other websites. The quotations sought for can be specific to a demographic or demographics of a user, be defined by a specific language or accent, age, geography, education level, socio-economic status, or use other characteristics of the user. Alternatively, the server 302 can search for all available quotations up to a limit. The server 302 captures the quotations in a quotation lattice 316, applying a personality attribute analysis 318 to the quotations, thereby determining personality independent 320 and personality dependent attributes of the quotations. The quotation lattice 318 is rearranged 322 based on the personality independent attributes 320, resulting in a personality independent quotation lattice 324. The server 302 then applies a stylistic analysis 326, described above, which identifies lexical and/or semantic distinctions of the quotations based on distinctions in the speakers of the quotes. Based on the stylistic analysis 326, the personality independent quotation lattice 324 is used to create a personalized natural language generation model which can provide the user synthetic speech and/or text in a personalized manner.

Figure 4:
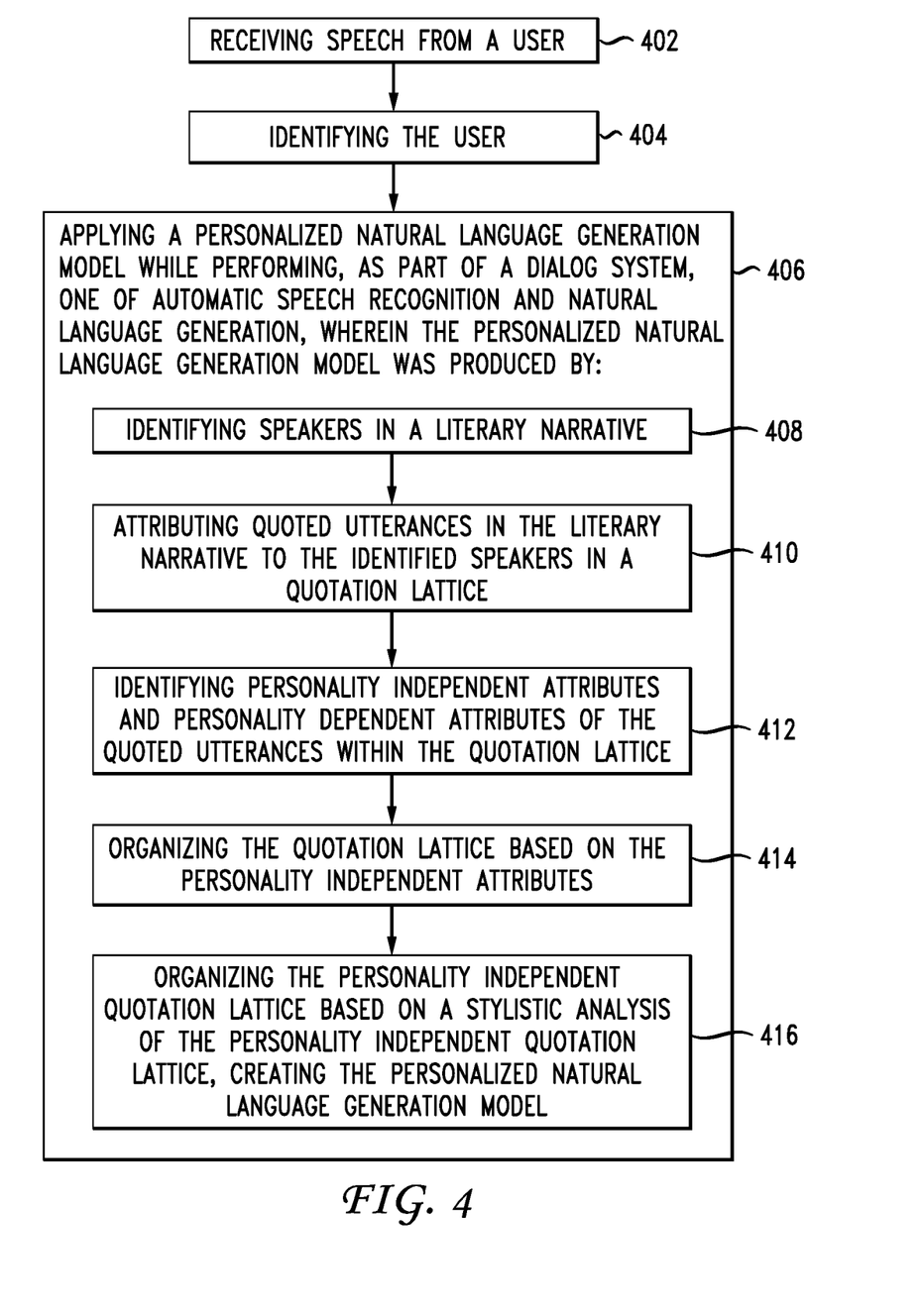
FIG. 4 illustrates an example method embodiment.

Having disclosed some basic system components and concepts, the disclosure now turns to the exemplary method embodiment shown in FIG. 4. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

The system 100 receives speech from a user (402). The speech can be received directly, if the system 100 is in the form of a smartphone, tablet, laptop, personal computer, or other personal computing device, or indirectly if a computing device acts as a client corresponding with a host server. The system 100 identifies the user based on a voice analysis of the speech (404), an identification provided with the speech, and/or based on other input in addition to the speech. For example, the user can provide input such as a password, biometric data, and/or other log-in information, which can be physically entered and/or audibly entered. This information can be used to as the identification or to look up the identification of the user. Alternatively, the voice analysis can extract characteristics, keywords, or data from the speech, which can be used to look up the identity of the user by correlating the characteristics, keywords, or other data with known individuals.

Identifying the user can be more than just knowing the identity of the user. Identifying the user can also include discovering the demographics, prosody, preferences, attitudes, and other information about the user. Demographics of the user can include gender, age, education level, accent, geography/current location/past location, ethnicity, language, and/or socioeconomic status. Prosody of the user can include pitch, speed, rhythm, or other factors which affect how speech sounds. The level of detail about the user which the system 100 discovers can be based on a capacity to create a personalized language generation model. For example, if the system 100 has capacity to only personalize the model for issues of gender and age, other demographics such as ethnicity and socio-economic status are not needed. Alternatively, the level of detail about the user can be based on a level provided by the user. If the user only wants to share specific information about themselves, or wants to share anything/everything about themselves, various system configurations can accomplish the desired level of personalization sought.

Based on the identification of the user, the system 100 can apply a personalized natural language generation model while performing, as part of a dialog system, one of automatic speech recognition and natural language generation (406). The system 100 can further produce, with or without using templates, speech and/or text to continue, or respond to, the speech dialogue in which the speech was received.

The personalized language generation model used by the system 100 can be produced by identifying speakers in a literary narrative (408). Examples of a literary narrative include novels, television transcripts, movie transcripts, screenplays, audio transcripts, and/or articles. Alternatively, or in addition to, literary narratives, the system can use websites, videos, social media, or other data repositories/databases where the authors, speakers, or other "characters" are known or can be identified. Quotations by the identified speakers of the literary narrative (or other resource) have quotes attributed to them in a quotation lattice (410). Personality independent attributes and personality dependent attributes of the quoted utterances within the quotation lattice are identified (412), and the quotation lattice is organized/reorganized based on the personality independent attributes (414). The personality independent quotation lattice is then organized based on a stylistic analysis of the personality independent quotation lattice, creating the personalized natural language generation model (416). The stylistic analysis can use the personality dependent attributes, as well as identifying a semantic and/or lexical difference between quotations associated with distinct demographics of the identified speakers. These processes, while described in a serial fashion, can be performed in other orders (such having parallel processes), add/remove components, or be integrated into the system 100 being used for the dialog system. That is, the system 100 being used to engage in a dialog with the user can also generate the personalized natural language generation model. Yet another configuration of the system 100 only generates the personalized natural language generation model for use by other dialog systems.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to speech dialogue systems and written dialogue systems. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A method comprising:
receiving a literary narrative;
generating, via a processor, a personalized natural language generation model based on a stylistic analysis of the literary narrative, wherein the stylistic analysis identifies connections between two or more of a personality independent quotation lattice, a personality independent attribute, a personality dependent attribute, and a speaker within the literary narrative; and applying the personalized natural language generation model to a spoken dialog system.

2. The method of claim 1, further comprising:
identifying, via a processor configured to perform speech analysis, an identity of a user based on characteristics of received speech during a dialog between the user and the spoken dialog system, to yield a user identification.

3. The method of claim 2, wherein the generating of the personalized natural language generation model is further based on the user identification.

4. The method of claim 1, further comprising:
applying the personalized natural language generation model to the spoken dialog system while performing, as part of a dialog, one of automatic speech recognition or natural language generation.

5. The method of claim 1, wherein stylistic analysis further comprises:
identifying speakers in the literary narrative, to yield identified speakers;
attributing quoted utterances in the literary narrative to the identified speakers, to yield a quotation lattice;
identifying the personality independent attributes and the personality dependent attributes of the quoted utterances within the quotation lattice; and
organizing the quotation lattice based on the personality independent attributes, to yield the personality independent quotation lattice.

6. The method of claim 1, wherein the stylistic analysis further comprises identifying a lexical difference between quotations associated with distinct demographics of speakers within the literary narrative.

7. The method of claim 1, wherein the stylistic analysis further comprises identifying a semantic difference between quotations associated with distinct demographics of speakers within the literary narrative.

8. The method of claim 1, wherein the stylistic analysis comprises identifying both a lexical difference and a semantic difference between quotations associated with distinct demographics of speakers within the literary narrative.

9. The method of claim 2, wherein the identifying of the user from the received speech further comprises performing a prosody analysis of the received speech.

10. A system comprising:
a processor; and
a computer-readable storage medium having instructions stored which, when executed by the processor, cause the processor to perform operations comprising:
receiving a literary narrative;
generating a personalized natural language generation model based on a stylistic analysis of the literary narrative, wherein the stylistic analysis identifies connections between two or more of a personality independent quotation lattice, a personality independent attribute, a personality dependent attribute, and a speaker within the literary narrative; and
applying the personalized natural language generation model to a spoken dialog system.

11. The system of claim 10, the computer-readable storage medium further stores instructions stored which, when executed by the processor, cause the processor to perform operations further comprising:

identifying an identity of a user based on characteristics of received speech during a dialog between the user and the spoken dialog system, to yield a user identification.

12. The system of claim 11, wherein the generating of the personalized natural language generation model is further based on the user identification.

13. The system of claim 1, the computer-readable storage medium further stores instructions stored which, when executed by the processor, cause the processor to perform operations further comprising:
applying the personalized natural language generation model to the spoken dialog system while performing, as part of a dialog, one of automatic speech recognition or natural language generation.

14. The system of claim 1, wherein stylistic analysis further comprises:
identifying speakers in the literary narrative, to yield identified speakers;
attributing quoted utterances in the literary narrative to the identified speakers, to yield a quotation lattice;
identifying the personality independent attributes and the personality dependent attributes of the quoted utterances within the quotation lattice; and
organizing the quotation lattice based on the personality independent attributes, to yield the personality independent quotation lattice.

15. The system of claim 10, wherein the stylistic analysis further comprises identifying a lexical difference between quotations associated with distinct demographics of speakers within the literary narrative.

16. The system of claim 10, wherein the stylistic analysis further comprises identifying a semantic difference between quotations associated with distinct demographics of speakers within the literary narrative.

17. The system of claim 10, wherein the stylistic analysis comprises identifying both a lexical difference and a semantic difference between quotations associated with distinct demographics of speakers within the literary narrative.

18. The system of claim 11, wherein the identifying of the user from the received speech further comprises performing a prosody analysis of the received speech.

19. A non-transitory computer-readable storage device having instructions stored which, when executed by a computing device, cause the computing device to perform operations comprising:
receiving a literary narrative;
generating a personalized natural language generation model based on a stylistic analysis of the literary narrative, wherein the stylistic analysis identifies connections between two or more of a personality independent quotation lattice, a personality independent attribute, a personality dependent attribute, and a speaker within the literary narrative; and
applying the personalized natural language generation model to a spoken dialog system.

20. The non-transitory computer-readable storage device of claim 19, wherein the non-transitory computer-readable storage device stores further instructions stored which, when executed by the computing device, cause the computing device to perform operations further comprising:
identifying an identity of a user based on characteristics of received speech during a dialog between the user and the spoken dialog system, to yield a user identification.

* * * * *